Figure 1:
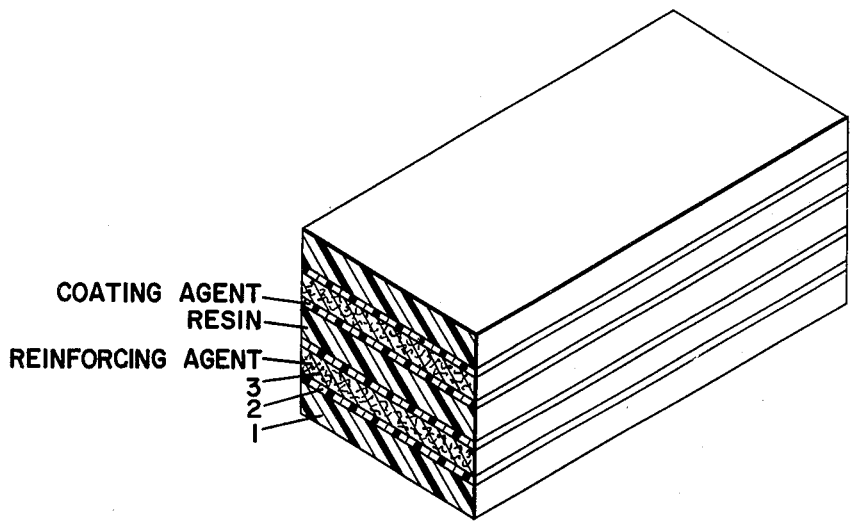

April 16, 1963   H. CLARK   3,085,919
LAMINATED ARTICLES OF REINFORCED PLASTICS
AND METHODS OF MAKING SAME
Filed Jan. 31, 1958

Hadden Clark   Inventor

By _____ Attorney

3,085,919
LAMINATED ARTICLES OF REINFORCED PLASTICS AND METHODS OF MAKING SAME
Hadden Clark, Plainfield, N.J., assignor to Esso Research and Engineering Company, a corporation of Delaware
Filed Jan. 31, 1958, Ser. No. 712,442
12 Claims. (Cl. 154—43)

The present invention relates to a coupling agent for reinforced plastic and more particularly to the coating of reinforcing agents with a coupling agent to bond the reinforcing agents with the resins to a unitary product.

In the past, there has been a considerable problem in obtaining sufficient adhesion between a hydrophobic resin and a hydrophilic reinforcing agent. Many of the coupling materials used in the past will effect satisfactory adhesion if the reinforced plastic is tested for its dry strength. However, after it is in contact with a liquid for a period of time, the strength is drastically reduced. This, therefore, is a serious disadvantage for the use of reinforced plastics, especially in pipes and liquid storage containers where the wet strength of the material is paramount.

The coupling agents used in the past can be categorized in two types: One type is that which chemically bonds the reinforcing agent to the resin. For example, glass fibers may be treated with an unsaturated organic halo silane having the formula $R_nSiX_{4-n}$ where R is unsaturated and $n$ is a positive integer equal to 1, 2, or 3, and X is halogen. It is preferred to employ those silanes wherein $n$ is equal to 1, i.e., those containing 3 atoms of halogen substituted on the silicon. It is believed that these compounds react with the hydroxyl groups in the glass, liberating hydrogen chloride. The unsaturated or vinyl portion of the molecule, thus bound to the glass through the silicon atom, reacts with the unsaturated resin used in the reinforced plastic. However, there may still be some water present on the surface which will decrease the adhesion of the resin and the fiber. The water could be removed by curing the laminated material at a very high temperature. However, this is impossible as decomposition of the coupling agents would begin before high enough temperatures were reached. Consequently, there is a disadvantage in the use of the coupling agents of the type heretofore described.

The second type of coupling agents includes oils or waxes which are coated on the surface of the glass. The disadvantage in this process is that sufficient water will infiltrate to reduce adhesion in certain products such as pipes and liquid storage containers.

The present invention provides a method for improving the wet strength of the reinforced plastic without the disadvantages previously encountered in two prior methods. This will be discussed in detail in the ensuing paragraphs.

In accordance with one embodiment of this invention, the reinforcing agents are coated with a solution of an oxidized synthetic polymer. The coated material is then cured by any known method as baking or flame curing. The coated reinforcing agent is subsequently laminated with a curable liquid mix to any desired form as a cylindrical hollow pipe or a solid rectangular sheet. The final step is to cure the reinforced plastic product to a unitary rigid structure.

Figure 2:
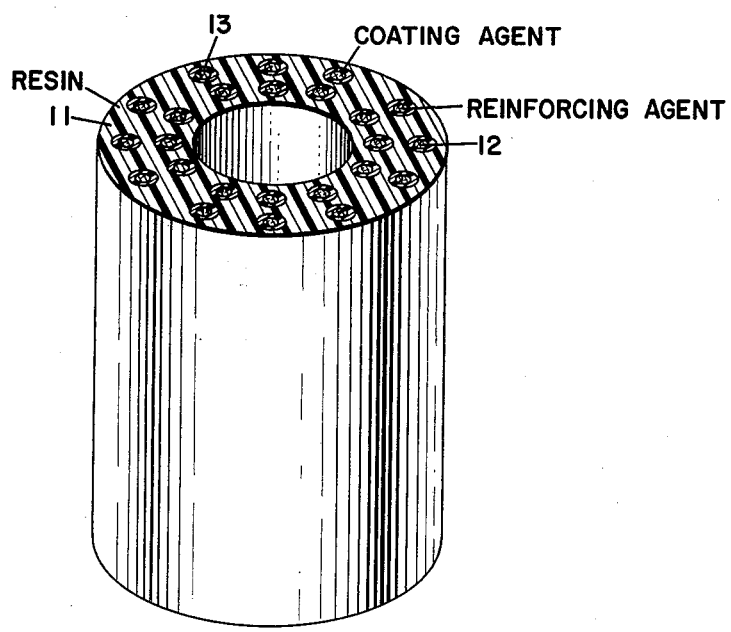

Referring to the drawing, FIGURE 1 is a solid rectangular laminate which comprises a resin 1 bonded to a reinforcing agent 3, e.g., glass cloth, to which a coating agent 2 has been applied. FIGURE 2 is a hollow cylindrical pipe of a reinforced resin. A coating agent 13 has been applied to a reinforcing agent 12, e.g., glass fiber. The coated material is then bonded to a resin 11.

The reinforcing agents or fillers that are applicable to this invention are particularly those which have hydrophilic surfaces. Examples of such materials are glass, rock, talc, and mineral fillers, especially glass fibers, glass wool, rock wool, and the like. These agents, because of their attraction for water, are the ones which cause the problem of insufficient adhesion with a resin. Reinforcing agents may be used in amounts of up to 80%, preferably 50–70%.

Synthetic drying oils used in this invention are the conjugated diolefins having 4 to 6 carbon atoms per molecule, as butadiene, isoprene, dimethyl butadiene, piperylene, and methyl pentadiene. Diolefins, copolymerized with minor amounts of ethylenically unsaturated monomers as styrene, acrylonitrile, methyl vinyl ketone, or with styrenes having alkyl groups substituted on the ring (paramethyl styrene, dimethyl styrene, etc.), may also be used. Such synthetic oils may be prepared by mass polymerization, either in the presence of a hydrocarbon soluble peroxide catalyst or in the presence of metallic sodium. An especially preferred polymer is one prepared by reacting 75 to 85 parts of butadiene and 25 to 15 parts of styrene to form a copolmer utilizing metallic sodium catalyst. Polymerization is carried out in a reaction diluent at temperatures from about 25° C. to 95° C. with about 0.5 to 5 parts of finely divided sodium per 100 parts of monomers used. The diluent used in the polymerization must boil betwene about —15° C. and 200° C., in amounts ranging from 100 to 500 parts of monomers; preferred diluents are aliphatic hydrocarbons such as solvent naphtha or Varsol (straight run mineral spirits; API gravity, 49.0; flash, 105° F.; boiling range, 150° to 200° C.; solvent power 33–37 kauri-butanol value). A codiluent, about 10 to 45 parts per 100 parts of monomers, may be used, consisting of a $C_4$ to $C_8$ aliphatic ether or cyclic ethers and polyethers other than those having a —O—C—O— grouping; a typical example is dioxane 1,4. Finally, it is beneficial to use about 5 to 35 weight percent (based on sodium) of an alcohol such as methanol, isopropanol, or an amyl alcohol. The resulting product may vary in viscosity and it may be altered for use in the curable liquid mix. The preparation of this drying oil and its resin is described in U.S. Patents Nos. 2,762,851 and 2,772,254, respectively, which is incorporated herein by reference.

These polymeric oils are then oxidized by blowing them with air or oxygen, preferably in the presence of a solvent, as aromatic solvents or solvent mixtures having a kauri butanol value of at least 40. More paraffinic solvents as Varsol may also be used if a product containing less oxygen is desired. The choice of solvents will depend upon the oxygen content desired in the finished oil, the formation of the coating compositions, and the most economical one to achieve the desired results. Examples of suitable solvents include aromatic hydrocarbons, with or without aliphatic hydrocarbons, boiling up to about 250° C., preferably between 100° and 200° C. The oxidation can be carried out by blowing air or oxygen into the polymer with or without a catalyst. Suitable catalysts are organic salts of metals such as cobalt, lead, iron, and manganese. The naphthenates, octanoates, and oleates are especially suitable. These catalysts are used in amounts ranging from 0.001% to 1.0%. The nature of the oxidized diolefin polymer largely depends upon the type of original polymerization and the extent of oxidation which is dependent upon various factors as time, temperature, catalyst, and solvent. Preferred compounds are the oxidized copolymers of 75 to 85% butadiene and 25 to 15% styrene with about 5 to 17% oxygen in the structure.

In accordance with the present invention, the coupling agent employed should consist of a 0.1 to 15% solution, preferably 1.0 to 5% of the oxidized polymer, preferably in a hydrocarbon low-boiling solvent. Other coupling agents are not necessary, but they may be used in conjunction with the oxidized polymer. These coupling agents, for example vinyl trichloro silane, may be put on the reinforcing agents before they are subjected to the oxidized polymer solution or they may be added to the solution in the rang $\frac{1}{20}$ to 1%. The time and temperature are not critical in this part of the process. About room temperature is satisfactory, and the time of contact with the solution should be sufficient to completely wet the surface of the reinforcing agent. This can be a small fraction of a second, preferably 0.1 to 180 seconds.

The reinforcing agent, with the oxidized polymer solution on its surface, is then cured by conventional means. A particularly desirable method is flame curing exemplified by the following technique. The surface of the reinforcing agent is contacted with a flame of a gas burner, preferably nonluminous or oxidizing. The temperature should be in the range of about 500 to 900° F. and the time of exposure may be in the range of about ½ to 10 minutes. Another method of curing the surface coating on the reinforcing agent is by air drying or baking in an oven at a temeprature of about 150° to 500° F. and for about 2 minutes to 10 hours.

The reinforcing agent thus coated is then laminated with a resinifiable polymer by any method. One method, used in the manufacture of solid rectangular sheets, is to alternate the layers of curable liquid and glass cloth which has been coated with the oxidized polymer. After the desired thickness is obtained the sheet is cured to a unitary rigid product. A second method can be used for the manufacture of cylindrical hollow pipes. Glass fibers, precoated with an oxidized polymer, can be dipped in the curable liquid solution and wound about a steel mandrel. This can be accomplished by any method. In one method, the fiber rovings, e.g., glass fibers, are wound at an angle to the axis of the mandrel circumferentially in superimposed layers to form a peripheral shell of the pipe (U.S. Patent 2,714,414). A suitable angle is that described in U.S. Patent 2,747,626 where the angle A is determined by the equation $3 \sin^2 a + (2/m) \sin a = 1$ in which $m$ is the ratio of the total cross-sectional area of all the helically disposed rubber to the total cross-sectional area of all the longitudinally disposed rubber. After the desired shape is obtained, the wrapping can be treated on the mandrel under controlled conditions to form the unitary rigid pipe.

The resinifiable, curable liquid polymers most applicable in this invention are those which are hydrophobic. It is these polymers which have the poor adhesive qualities when bonded to hydrophilic reinforcing agents. The hydrophobic polymers used in this invention may be any one that is unsaturated, that is, contains double bonds in its structure and can be cross-linked, with or without the utilization of cross-linking agents. A preferred curable liquid is one that is prepared from oily polymers, heretofore described, of conjugated diolefins having 4 to 6 carbon atoms per molecule (butadiene, etc.) or copolymers in mixtures with each other or in admixtures with minor amounts of ethylenically unsaturated monomers (styrene, etc.). Another curable liquid which could be the basis for the mix includes polyesters. Polyesters may be derived by the condensation of compounds containing hydroxyl and carboxyl groups and having a typical structure as below:

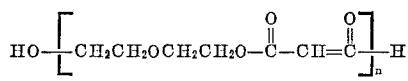

where $n$ represents the degree of polymerization. A typical unsaturated polyester may be prepared by reacting an unsaturated polybasic acid, or its anhydride such as maleic anhydried, with a polyhydric alcohol such as diethylene glycol. The reaction may proceed at elevated temperature. It is these unsaturated polyesters that can be included in this invention, for these compounds can be cross-linked to hard rigid structures.

It is advantageous to employ in the curable liquid mix certain cross-linking agents, as triallyl cyanurate, diallyl phthalate, and methyl styrene. If they are incorporated in the mix, the range should be from 0 to 50 parts per 100 parts by weight of the curable liquid. A catalyst is used in the range of 2 to 10 parts and should be of a free radical or peroxide type. Preferred catalysts are dicumyl peroxide or ditertiary butyl peroxide. The curable liquid mix comprises from 50 to 100 parts by wt. of liquid thermosetting polymer of butadiene or copolymer of butadiene with styrene, from 0 to 50 parts by wt. of the aforementioned cross-linking agents and from 3 to 10 parts by wt. of the catalyst of the free radical or peroxide type.

The coated reinforcing agent and curable liquid polymer are then cured by known methods to obtain a reinforced plastic. A baking method is generally used at a temperature of about 200° to 320° F., preferably 280° to 300° F., at a pressure from about atmospheric to about 1,000 p.s.i., preferably atmospheric to 800 p.s.i. The time will be dependent upon the temperature but will probably be in the range of about 20 minutes to about 6 hours.

The product thus prepared is superior to other reinforced plastics with respect to the unexpected improvement in the wet strength characteristics. The oxidized polymer solution used as the coupling agent does not have the serious disadvantages that have been encountered in using those prior art agents which chemically bond the resin to the reinforcing agent. The curing of a reinforced plastic with the oxidized polymer coupling agent of invention can be conducted at a higher temperature, thereby removing considerably more water. This will result in improved adhesion between the resin and the reinforcing agent. The coupling agent of this invention also overcomes the disadvantage of the oil- or wax-type coupling agent used in the prior art. The oil- and wax-type coupling agent results in the infiltration of enough water to cause the adhesion between the resin and the reinforcing agent to be insufficient for use in certain items as pipes and liquid storage tanks. However, the adhesion obtained through the use of this invention is such that the wet strength of the reinforcing plastic is increased and is satisfactory for utilization in those items (pipes, etc.).

The following example is submitted to illustrate and not to limit this invention.

*Example*

A 3% solution was prepared comprising an acetone-Solvesso solvent and a copolymer of 80% butadiene with 20% styrene containing 16% oxygen in its structure. Solvesso has a high percentage of aromatics with an API gravity of 30.2, a flash point of 118° C., and a boiling range of 322–351° F. Glass cloth (181 grade Garan finish) was coated by dipping the cloth into the solution at room temperature for about 60 seconds. The 3% by weight coating obtained was cured by baking for an hour at 150° C. A ⅛-inch-thick laminate (70% cloth) was made from 14 plies of the coated cloth and a curable liquid mix. This mix was composed of 85 parts of a copolymer of butadiene and styrene (80 and 20%, respectively), 13 parts of methyl styrene, and 2 parts of triallyl cyanurate. The catalyst was 6 parts of dicumyl peroxide. The laminate obtained was cured for an hour at 280° F. in a mold at atmospheric pressure and given an overnight postcure at 280° F.

A control was made from the same mix and glass cloth; however, the glass cloth did not have the oxidized polymer coating. The wet and dry flexural strengths were tested according to ASTM procedure D790-49T and the results are indicated below:

| Laminate | Flexural Strength (lbs./in.²) | | Percent Retention |
| --- | --- | --- | --- |
| | Dry | Wet (after 2 hrs. water boil) | |
| 1. Control | 56,000 | 42,000 | 75 |
| 2. Oxidized polymer coating on glass cloth | 57,400 | 51,800 | 90 |

It is apparent from the example that the oxidized polymer coating has vastly improved the wet strength characteristics of the plastics. With the incorporation of this invention, it is now possible to use reinforced plastic items for contact with liquids where these items could previously be used only if there was an absence of moisture. For example, pipes and liquid storage tanks could not be fabricated from certain reinforced plastics; however, these plastics can now be used if the reinforcing agent is coated with an oxidized polymer solution. This, therefore, is the invention and substantial contribution to the art.

Having set forth the general nature and embodiments of the present invention, the true scope is particularly pointed out in the appended claims.

What is claimed is:

1. An article comprising a thermosetting hydrophobic resin bonded to a hydrophilic reinforcing element with a thermosetting material of an oxidized liquid polymer of a $C_4$ to $C_6$ conjugated diolefin therebetween.

2. An article comprising a thermosetting hydrophobic resin of a liquid copolymer of butadiene with styrene bonded to glass fibers with a thermosetting material of an oxidized liquid copolymer of butadiene with styrene therebetween.

3. An article comprising a hydrophobic resin which comprises 50 to 100 parts of a liquid copolymer of butadiene with styrene, 0 to 50 parts of a crosslinking agent selected from the group consisting of methyl styrene and triallyl cyanurate, and 3 to 10 parts of a catalyst selected from the group consisting of dicumyl peroxide and ditertiary butyl peroxide bonded to glass fibers with a thermosetting material of an oxidized liquid copolymer of butadiene with styrene therebetween.

4. An article comprising a hydrophobic resin which comprises 50 to 100 parts of a liquid copolymer of butadiene with styrene, 0 to 50 parts of methyl styrene, 3 to 10 parts of dicumyl peroxide bonded to glass fibers with a thermosetting material of an oxidized liquid copolymer of butadiene with styrene therebetween.

5. An article comprising a hydrophobic resin which comprises 50 to 100 parts of a liquid copolymer of butadiene with styrene, 0 to 50 parts of methyl styrene, 3 to 10 parts of ditertiary butyl peroxide bonded to glass fibers with a thermosetting material of an oxidized liquid copolymer of butadiene with styrene therebetween.

6. A fiber reinforced composite pipe comprising reinforcing fibers layed up circumferentially in superimposed layers to form a peripheral shell of the pipe bonded to a hydrophobic resin with a thermosetting material of an oxidized liquid polymer of a $C_4$ to $C_6$ conjugated diolefin therebetween.

7. The article as in claim 6 in which the polymer of a $C_4$ to $C_6$ conjugated diolefin is selected from the group consisting of the polymer of butadiene and the copolymer of butadiene with styrene.

8. A process which comprises applying a thermosetting material of an oxidized liquid polymer of a $C_4$ to $C_6$ conjugated diolefin onto the surface of a hydrophilic reinforcing element and subsequently curing said material on said surface to provide a coated element therefrom; laminating said coated element with a resinifiable thermosetting hydrophobic mix comprising a resinifiable polymer; and curing the resultant composition and said coated element to provide a reinforced plastic therefrom with increased wet strength.

9. A process which comprises applying a thermosetting material of an oxidized liquid copolymer of butadiene with styrene onto the surface of glass fibers and subsequently curing said material on said surface to provide coated glass fibers therefrom; laminating said coated fibers with a resinifiable thermosetting hydrophobic liquid copolymer of butadiene with styrene; and curing the resultant composition and coated fibers to provide a reinforced plastic therefrom with increased wet strength.

10. A process which comprises applying a thermosetting material of an oxidized liquid copolymer of butadiene with styrene onto the surface of glass fibers and subsequently curing said material on said surface to provide coated glass fibers therefrom; laminating said coated fibers with a resinifiable hydrophobic thermosetting mix comprising 50 to 100 parts of a liquid copolymer of butadiene with styrene, 0 to 50 parts of a crosslinking agent selected from the group consisting of methyl styrene and triallyl cyanurate, and 3 to 10 parts of a catalyst selected from the group consisting of dicumyl peroxide and ditertiary butyl peroxide; and curing the resultant composition and said coated fibers to provide a reinforced plastic therefrom with increased wet strength.

11. A process which comprises applying a thermosetting material of an oxidized liquid copolymer of butadiene with styrene onto the surface of glass fibers and subsequently curing said material on said surface to provide coated glass fibers therefrom; laminating said coated fibers with a resinifiable hydrophobic thermosetting mix comprising 50 to 100 parts of a liquid copolymer of butadiene with styrene, 0 to 50 parts of methyl styrene, and 3 to 10 parts of dicumyl peroxide; and curing the resultant composition and said coated fibers at a temperature between 200 and 320° F. to provide a reinforced plastic therefrom with increased wet strength.

12. A process which comprises applying a thermosetting material and an oxidized liquid copolymer of butadiene with styrene onto the surface of glass fibers and subsequently curing said material on said surface to provide coated glass fibers therefrom; laminating said coated fibers with a resinifiable hydrophobic thermosetting mix comprising 50 to 100 parts of a liquid copolymer of butadiene with styrene, 0 to 50 parts of methyl styrene, and 3 to 10 parts of ditertiary butyl peroxide; and curing the resultant composition and coated fibers at a temperature between 200 and 300° F. to provide a reinforced plastic therefrom with increased wet strength.

References Cited in the file of this patent

UNITED STATES PATENTS

| | | |
| --- | --- | --- |
| 2,128,635 | Charch et al. | Aug. 30, 1938 |
| 2,383,733 | Parker | Aug. 28, 1945 |
| 2,384,547 | Fryling | Sept. 11, 1945 |
| 2,424,923 | Edgar et al. | July 29, 1947 |
| 2,611,718 | Steinman | Sept. 23, 1952 |
| 2,688,576 | Ryan et al. | Sept. 7, 1954 |
| 2,703,774 | Morrison | Mar. 8, 1955 |
| 2,717,217 | Sullivan | Sept. 6, 1955 |
| 2,725,321 | Martello | Nov. 29, 1955 |
| 2,742,377 | Bezman | Apr. 17, 1956 |
| 2,767,741 | Knowland et al. | Oct. 23, 1956 |
| 2,801,189 | Collier | July 30, 1957 |
| 2,855,373 | Guenther | Oct. 7, 1958 |
| 2,856,300 | McKay | Oct. 14, 1958 |
| 2,932,598 | Henning | Apr. 12, 1960 |

FOREIGN PATENTS

| | | |
| --- | --- | --- |
| 542,179 | Canada | June 11, 1957 |